(12) United States Patent
Lu et al.

(10) Patent No.: US 12,556,754 B2
(45) Date of Patent: Feb. 17, 2026

(54) SYSTEMS AND METHODS FOR GENERATING CONTENT SHARING PLATFORM RECOMMENDATIONS USING MACHINE LEARNING

(71) Applicant: Google LLC, Mountain View, CA (US)

(72) Inventors: Jing Lu, Burlingame, CA (US); Fei Dong, Palo Alto, CA (US); Ravi Viswanathan, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/944,571

(22) Filed: Nov. 12, 2024

(65) Prior Publication Data

US 2025/0168430 A1 May 22, 2025

Related U.S. Application Data

(60) Provisional application No. 63/600,625, filed on Nov. 17, 2023.

(51) Int. Cl.
*H04N 21/25* (2011.01)
*H04N 21/266* (2011.01)
*H04N 21/488* (2011.01)

(52) U.S. Cl.
CPC ......... *H04N 21/251* (2013.01); *H04N 21/266* (2013.01); *H04N 21/4882* (2013.01)

(58) Field of Classification Search
CPC . H04N 21/251; H04N 21/266; H04N 21/4882
See application file for complete search history.

(56) References Cited

U.S. PATENT DOCUMENTS

| | | | | |
|---|---|---|---|---|
| 7,117,518 B1 * | 10/2006 | Takahashi | ........ | H04N 21/44222 725/86 |
| 7,343,616 B1 * | 3/2008 | Takahashi | .............. | H04N 21/47 725/35 |
| 7,962,935 B2 * | 6/2011 | Kurosaki | ............... | H04H 20/76 725/39 |
| 8,484,511 B2 * | 7/2013 | Tidwell | .............. | H04N 21/6582 709/224 |
| 8,510,770 B1 * | 8/2013 | Oztaskent | .............. | H04H 60/56 709/201 |
| 8,531,606 B2 * | 9/2013 | Pyo | ......................... | H04H 60/32 348/731 |
| 8,588,589 B2 * | 11/2013 | Adimatyam | ..... | H04N 21/42661 386/230 |
| 9,118,935 B2 * | 8/2015 | Ren | .................. | H04N 21/25825 |

(Continued)

*Primary Examiner* — Michael B. Pierorazio
(74) *Attorney, Agent, or Firm* — Lowenstein Sandler LLP (57) ABSTRACT

A method includes identifying a channel associated with a user of a content sharing platform. An indication of one or more channel related features associated with the channel is provided as input to an artificial intelligence (AI) model. The AI model is trained to predict a number of new users to obtain at least one content access level for the channel within a predetermined time of an effective date of the at least one content access level for the channel. One or more outputs of the AI model is obtained. The one or more obtained outputs comprise a predicted number of new users to obtain at least one content access level for the channel within a predetermined time of an effective date of the at least one content access level for the channel. A recommendation is provided for presentation on a client device of the user.

20 Claims, 5 Drawing Sheets

(56) References Cited

U.S. PATENT DOCUMENTS

| | | | |
|---|---|---|---|
| 9,571,784 B2* | 2/2017 | Roberts | H04N 21/25833 |
| 10,791,355 B2* | 9/2020 | Sheppard | H04N 21/252 |
| 10,893,332 B2* | 1/2021 | Isbiliroglu | H04N 21/8456 |
| 2002/0056087 A1* | 5/2002 | Berezowski | H04N 21/488 |
| | | | 348/E7.071 |
| 2003/0145319 A1* | 7/2003 | Sato | H04N 21/6587 |
| | | | 725/20 |
| 2005/0149964 A1* | 7/2005 | Thomas | H04N 21/442 |
| | | | 348/E7.071 |
| 2006/0136965 A1* | 6/2006 | Ellis | G06F 16/78 |
| | | | 348/E7.071 |
| 2007/0136753 A1* | 6/2007 | Bovenschulte | H04N 7/17318 |
| | | | 348/E7.071 |
| 2007/0143778 A1* | 6/2007 | Covell | H04N 21/8133 |
| | | | 725/135 |
| 2007/0294740 A1* | 12/2007 | Drake | H04N 21/47202 |
| | | | 348/E7.071 |
| 2009/0147786 A1* | 6/2009 | Li | H04N 21/2396 |
| | | | 370/390 |
| 2010/0313217 A1* | 12/2010 | Bassali | H04N 21/4425 |
| | | | 725/151 |
| 2012/0124620 A1* | 5/2012 | Nishizawa | H04N 21/488 |
| | | | 725/34 |
| 2013/0276139 A1* | 10/2013 | McDade, Sr. | H04N 21/8355 |
| | | | 726/27 |
| 2016/0234078 A1* | 8/2016 | Jana | H04L 47/25 |
| 2018/0176622 A1* | 6/2018 | Sheppard | H04N 21/252 |
| 2020/0213635 A1* | 7/2020 | Baick | H04N 21/238 |
| 2022/0368988 A1* | 11/2022 | Thomas | H04N 21/4518 |

\* cited by examiner

SYSTEMS AND METHODS FOR GENERATING CONTENT SHARING PLATFORM RECOMMENDATIONS USING MACHINE LEARNING

RELATED APPLICATION

This application claims the benefit of U.S. Provisional Application No. 63/600,625, filed Nov. 17, 2023, the entire content of which is hereby incorporated by reference.

TECHNICAL FIELD

The disclosed implementations relate to methods and systems for generating content sharing platform recommendations using machine learning.

BACKGROUND

Content sharing platforms allow users to connect to and share information with each other. Many content sharing platforms include a content sharing aspect that allows users to upload, view, and share content, such as video items, image items, audio items, and so on. Other users of the content sharing platform can comment on the shared content, discover new content, locate updates, share content, and otherwise interact with the provided content. The shared content can include content from professional content creators, e.g., movie clips, TV clips, and music video items, as well as content from amateur content creators, e.g., video blogging and short original video items.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

An aspect of the disclosure provides a computer-implemented method comprising identifying a channel associated with a user of a content sharing platform. An indication of one or more channel related features associated with the channel is provided as input to an artificial intelligence (AI) model. The AI model is trained to predict a number of new users to obtain at least one content access level for the channel within a predetermined time of an effective date of the at least one content access level for the channel. One or more outputs of the AI model is obtained. The one or more obtained outputs comprise a predicted number of new users to obtain at least one content access level for the channel within a predetermined time of an effective date of the at least one content access level for the channel. A recommendation reflecting the predicted number of new users to obtain the at least one content access level within the predetermined time of the effective date of the at least one content access level for the channel is provided for presentation on a client device of the user.

A further aspect of the disclosure provides a system comprising: a memory; and a processing device, coupled to the memory, the processing device to perform a method according to any aspect or implementation described herein.

A further aspect of the disclosure provides a non-transitory computer-readable medium comprising instructions that, responsive to execution by a processing device, cause the processing device to perform operations according to any aspect or implementation described herein.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Users who produce content for content sharing platforms are often referred to as content creators. The produced content, which can be owned by a content creator or another entity, may include video content, image content, audio content, text content, and so on (which may be collectively referred to as "media items"). Such media items can include audio clips, movie clips, TV clips, and music videos, as well as amateur content such as video blogging, short original videos, pictures, photos, other multimedia content, etc. In some content sharing platforms, users can provide their content to other users via one or more personal channels (hereafter "channel"). The channel can serve as a homepage for a channel owner's account and include media items having a common topic, theme, or substance. The media items can be chosen, made available, and/or uploaded by the channel owner to the channel. The channel owner can further customize their channel(s) by selecting a background and color scheme, controlling some of the information that appears on the channel, etc.

Channel owners can enable certain content-related features to monetize their channel(s). For example, channel owners can realize earnings from advertisements ("ads") that would appear during certain segments of certain media items, receive revenue from viewers via a gratuity feature, sell merchandise, etc. In some instances, channel owners can generate revenue by offering viewers (e.g., users of the content sharing platform) one or more particular levels of content access (referred to as a "content access level"). A content access level is a content sharing platform feature that allows "members" to join a channel through monthly fees and receive members-only benefits referred to as privileges. The privileges can include access to exclusive content (content not made available to non-members), badges, emojis, access to live-streams, chats and other bonus content that only members can access. In some instances, a particular channel can include multiple content access levels, where each level can include different privileges for a different monthly fee.

Content sharing platforms can generate recommendations to channel owners advising them to enable certain content-related features. For example, a content sharing platform can recommend channel owners to enable advertising against their content or to provide particular levels of content access. However, these recommendations are generally broadly targeted, fail to convey the beneficial impact of these features, and channel owners can receive multiple recommendations on a periodic basis. As such, many channel owners typically ignore these recommendations because they fail to see the value in them. As a result, computing resources consumed by content sharing platforms in generating the recommendations as well as computing resources consumed by channel owners in providing content access levels to a disinterested group of users are aimlessly expended.

Aspects and implementations of the present disclosure address the above and other deficiencies by providing a system for generating, for specific channel owners, personalized content access level recommendations that convey the potential impact of offering their viewers one or more levels of content access. A content access level recommendation can be an indicator, such as a pop-up message on a channel's user interface or an email that provides a channel owner with personalized data related to enabling a level of content access on a particular channel. The content access level recommendation can be indicative of how many new members are likely to obtain (e.g., by complying with requirements of) a level of content access within a certain number of days from the date ("effective date") when the channel owner enables the content access level on the channel. For example, a content access level recommendation can indicate to the channel owner that, by offering a particular level of content access, the channel owners can expect 20 members to comply with the requirements (e.g., fee requirements) for the level of content access within 30 days.

An artificial intelligence (AI) model can be trained to generate content access level recommendations. The AI model can be trained using certain channel related features corresponding to the channel and data indicative of the number of content access level subscriptions obtained by viewers of the channel within a predetermined time frame after individual content access levels were offered. A channel related feature can relate to specific data for the particular channel and the data can be related to a particular time frame corresponding to the activation of the content access level(s) on the channel. More specifically, a channel related feature can relate to data corresponding to viewer interactions with media items on the channel (e.g., views, likes, comments, viewer group characteristics (e.g., viewer group geographic location, viewer group education level, etc.), channel owner activities on the channel (e.g., number of media items added, number of playlists generated, type of content provided (e.g., live-streams, shorts, videos, etc.), metrics associated with the channel (e.g., number of subscribers, revenue generated by the channel, etc.), and so forth. For example, the channel related features can include the watch time per media item view 30 days prior to and/or after a particular content access level was activated, the number of viewer subscriptions added 20 days prior to and/or after a particular content access level was activated, the total number of content watch hours by certain user groups 15 days prior to and/or after a particular content access level was activated, etc. The AI model can be trained to learn relationships between certain channel related features and the number of content access levels obtained (e.g., subscribed to) by viewers of the channel within the predetermined time frame to be able to generate content access level recommendations. The trained AI model can then receive, as input, channel related features of a particular channel and generate, as output, data indicating a content access level recommendation specific to that channel.

Aspects of the present disclosure result in improved performance of recommendation tools. In particular, the aspects of the present disclosure enable generating personalized and targeted content access level recommendations for respective target channels. As a result, the recommendations specifically target particular channel owners, accurately convey the beneficial impact of enabling one or more levels of content access on their channels, and improve the conversion rate of dispatched recommendations. In addition, by generating personalized and targeted content access level recommendations, considerable time and computing resources aimlessly expended by conventional content sharing platforms are saved.

Figure 1:
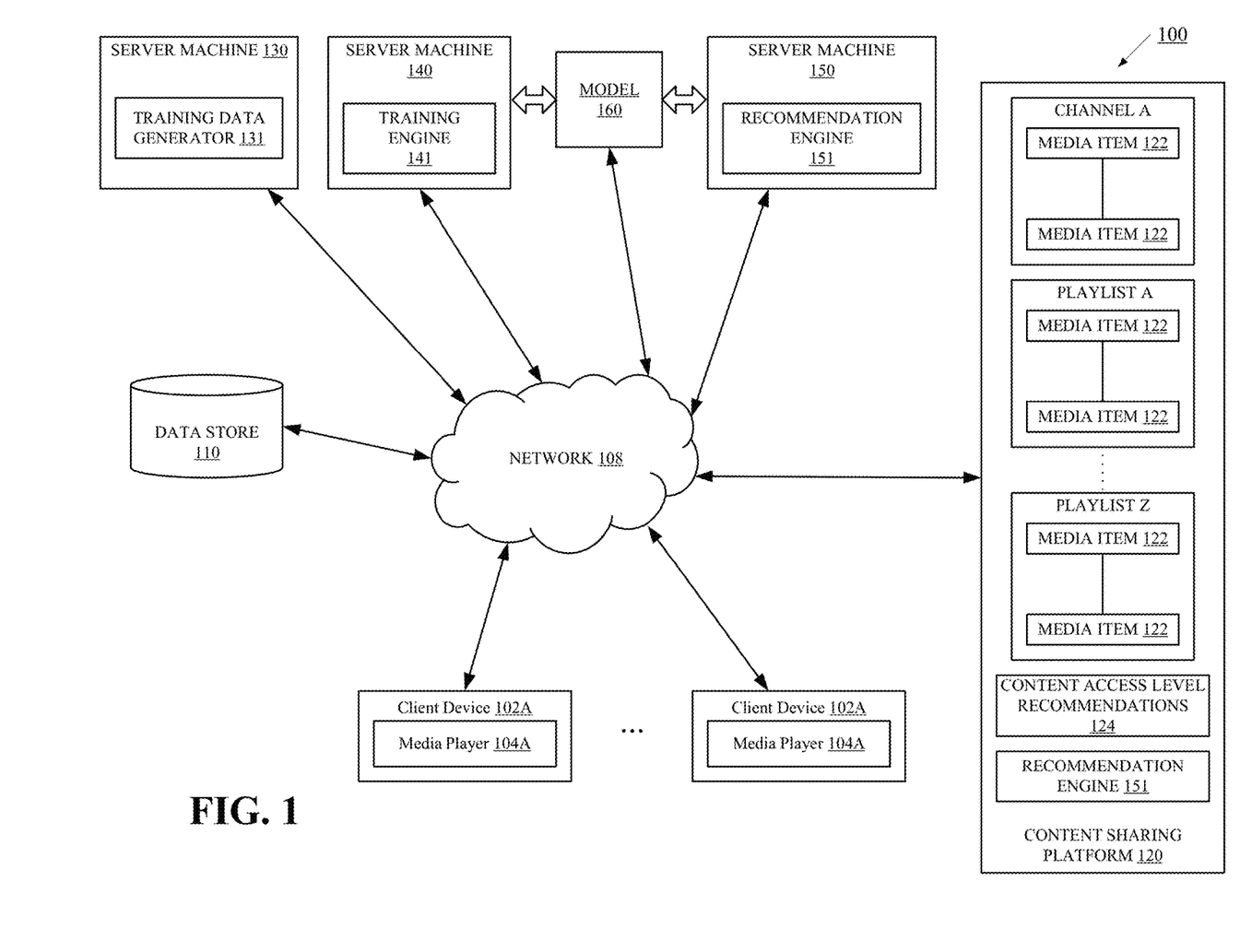
FIG. 1 illustrates an example of system architecture for generating and providing compressed 3D objects, in accordance with implementations of the disclosure.

FIG. 1 illustrates an example system architecture 100, in accordance with implementations of the present disclosure. The system architecture 100 (also referred to as "system" herein) includes client devices 102A-102N, data store 110, content sharing platform 120, and/or server machines 130, 140, 150 each connected to a network 108. In some implementations, network 108 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. Data store 110 can be hosted by one or more storage devices, such as main memory, magnetic or optical storage-based disks, tapes or hard drives, NAS, SAN, and so forth. In some implementations, data store 110 can be a network-attached file server, while in other implementations data store 110 can be some other type of persistent storage such as an object-oriented database, a relational database, and so forth, that may be hosted by application server 120 or one or more different machines (e.g., server machines 130, 140, 150, client device 102A-102N) coupled to the platform 120 via network 108.

Client devices 102A-102N can each include computing devices such as personal computers (PCs), laptops, mobile phones, smart phones, tablet computers, netbook computers, network-connected televisions, etc. In some implementations, client devices 102A-102N can also be referred to as "user devices." In some implementations, each client device 102A-102N can include a media player 104A-104N. In some implementations, media player 104A-104N can be applications that allow users, such as channel owner s, viewers, etc. to play back, view, or upload content, such as images, video items, web pages, documents, audio items, etc. For example, media players 104A-104N can be a web browser that can access, retrieve, present, or navigate content (e.g., web pages such as Hyper Text Markup Language (HTML) pages, digital media items, etc.) served by a web server. Media player 104A-104N can render, display, or present the content (e.g., a web page, a media viewer) to a user. In some implementations, media player 104A-104N can provide a user interface for presenting the media items and/or enabling user interaction with the media player 104A-104N. Media player 104A-104N can also include an embedded media player (e.g., a Flash® player or an HTML5 player) that is embedded in a web page (e.g., a web page that can provide information about a product sold by an online merchant). In another example, media players 104A-104N can be a standalone application (e.g., a mobile application, or native application) that allows users to playback digital media items (e.g., digital video items, digital images, electronic books, etc.). According to aspects of the present disclosure, media players 104A-104N can be a content sharing platform application for users to record, edit, and/or upload content for sharing on the content sharing platform. As such, media players 104A-104N can be provided to client devices 102A-102N by content sharing platform 120. For example, media players 104A-104N can be embedded media players that are embedded in web pages provided by the content sharing platform 120. In another example, media players 104A-104N can be applications that are downloaded from content sharing platform 120.

In some implementations, content sharing platform 120 and server machines 130, 140, 150, can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that can be used to provide a user with access to media items or provide the media items to the user. For example, content sharing platform 120 can allow a user to consume, upload, search for, approve of ("like"), disapprove of ("dislike"), or comment on media items. Content sharing platform 120 can also include a website (e.g., a webpage) or application back-end software that can be used to provide a user with access to the media items.

In some implementations of the disclosure, a "user" can be represented as a single individual. However, other implementations of the disclosure encompass a "user" being an entity controlled by a set of users and/or an automated source. For example, a set of individual users federated as a community in a social network can be considered a "user". In another example, an automated consumer can be an automated ingestion pipeline, such as a topic channel, of the content sharing platform 120.

The content sharing platform 120 can include multiple channels (e.g., channels A through Z, of which only channel A is shown in FIG. 1). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with a channel owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" can also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels can have their own feeds. For example, when navigating to a home page of a channel on the content sharing platform, feed items produced by that channel can be shown on the channel home page. Users can have a syndicated feed, which is a feed including at least a subset of the content items from all of the channels to which the user is subscribed. Syndicated feeds can also include content items from channels that the user is not subscribed to. For example, content sharing platform 120 or other social networks can insert recommended content items into the user's syndicated feed, or can insert content items associated with a related connection of the user in the syndicated feed.

Each channel can include one or more media items 122. Examples of a media item 122 can include, and are not limited to, digital video, digital movies, digital photos, digital music, audio content, melodies, website content, social media updates, electronic books (ebooks), electronic magazines, digital newspapers, digital audio books, electronic journals, web blogs, real simple syndication (RSS) feeds, electronic comic books, software applications, etc. In some implementations, the media item 122 can be a live-stream media item. In some implementations, media item 122 is also referred to as content or a content item.

For brevity and simplicity, rather than limitation, a video item, audio item, or gaming item are used as an example of a media item 122 throughout this document. As used herein, "media," media item," "online media item," "digital media," "digital media item," "content," and "content item" can include an electronic file that can be executed or loaded using software, firmware or hardware configured to present the digital media item to an entity. In one implementation, content sharing platform 120 can store the media items 122 using the data store 106. In another implementation, content sharing platform 120 can store video items or fingerprints as electronic files in one or more formats using data store 106.

In some implementations, media items 122 are video items. A video item is a set of sequential image frames representing a scene in motion. For example, a series of sequential image frames can be captured continuously or later reconstructed to produce animation. Video items can be presented in various formats including, but not limited to, analog, digital, two-dimensional and three-dimensional video. Further, video items can include movies, video clips or any set of animated images to be displayed in sequence. In addition, a video item (or media item) can be stored as a video file that includes a video component and an audio component. The video component can refer to video data in a video coding format or image coding format (e.g., H.264 (MPEG-4 AVC), H.264 MPEG-4 Part 2, Graphic Interchange Format (GIF), WebP, etc.). The audio component can refer to audio data in an audio coding format (e.g., advanced audio coding (AAC), MP3, etc.). It can be noted GIF can be saved as an image file (e.g., .gif file) or saved as a series of images into an animated GIF (e.g., GIF89a format). It can be noted that H.264 can be a video coding format that is a block-oriented motion-compensation-based video compression standard for recording, compression, or distribution of video content, for example.

In some implementations, the media item can be streamed, such as in a live-stream, to one or more of client devices 110A-110Z. It is be noted that "streamed" or "streaming" refers to a transmission or broadcast of content, such as a media item, where the received portions of the media item can be played back by a receiving device immediately upon receipt (within technological limitations) or while other portions of the media content are being delivered, and without the entire media item having been received by the receiving device. "Stream" can refer to content, such as a media item, that is streamed or streaming. A live-stream media item can refer to a live broadcast or transmission of a live event, where the media item is concurrently transmitted (e.g., from media capturing device 115A-115Z), at least in part, as the event occurs to a receiving device, and where the media item is not available in its entirety.

In some implementations, content sharing platform 120 can allow users to create, share, view or use playlists containing media items (e.g., playlist A-Z, containing media items 122). A playlist refers to a collection of media items that are configured to play one after another in a particular order without any user interaction. In some implementations, content sharing platform 120 can maintain the playlist on behalf of a user. In some implementations, the playlist feature of the content sharing platform 120 allows users to group their favorite media items together in a single location for playback. In some implementations, content sharing platform 120 can send a media item on a playlist to client device 110 for playback or display. For example, media player 104A-104N can be used to play the media items on a playlist in the order in which the media items are listed on the playlist. In another example, a user can transition between media items on a playlist. In yet another example, a user can wait for the next media item on the playlist to play or can select a particular media item in the playlist for playback.

In some implementations, a user (e.g., a viewer) can subscribe to one or more content access levels offered by the owner of a channel. A content access level can be a content sharing platform feature that allows "members" to join a channel by satisfying certain requirements (e.g., through periodic payments such as monthly payments) and receive members-only benefits referred to as privileges or "perks" for a specific access level. For example, the content access level can be a membership plan for a corresponding tier, a subscription plan for a corresponding tier, etc. The perks can include exclusive content (content not made available to non-members or members associated with lower access levels), badges, emojis, access to live-streams, chats and other bonus content that only members associated with the specific access level can access. In an illustrative example, a first content access level can include access to live-stream, a second content access level can include the perks of the first content access level as well as access to badges, while a third content access level can include the perks of the first content access level, the second content access level, and access to emojis.

In some implementations, the user can access content on sharing platform 120 through a user account. The user can access (e.g., log in to) the user account by providing user account information (e.g., username and password) via an application on client device 110 (e.g., media player 104A-104N). In some implementations, the user account can be associated with a single user. In other implementations, the user account can be a shared account (e.g., family account shared by multiple users) (also referred to as "shared user account" herein). The shared account can have multiple user profiles, each associated with a different user. The multiple users can login to the shared account using the same account information or different account information. In some implementations, the multiple users of the shared account can be differentiated based on the different user profiles of the shared account.

In some implementations, an authorizing data service (also referred to as a "core data service" or "authorizing data source" herein) is a highly-secured service that has access to data pertaining to user accounts on the content sharing platform 120 and that can use this data to decide whether to authorize a user account to obtain requested content. In some implementations, the authorizing data service can authorize a user account (e.g., client device associated with the user account) access to requested content, authorize delivery of the requested content to the client device, or both. Authorization of the user account to access the requested content can involve authorizing what content is accessed and who is permitted to access the content. Authorization of the delivery of the content can involve authorizing how the content is delivered. In some implementations, the authorizing data service can use user account information to authorize the user account. In some implementations, an authentication token associated with client device 102A-102N or media player 104A-104N can be used to determine whether to authorize the user account and/or playback of requested content. In some implementations, the authorizing data service is part of content sharing platform 120. In other implementations, the authorizing data service can be an external service, such as a highly-secured authorizing service offered by a third-party.

In some implementations, content delivery platform 120 can use a content distribution network (CDN) (not shown) to stream the media items to one or more client devices 102A-102N for consumption by users. A CDN includes a geographically distributed network of servers that work together to provide fast delivery of content. The network of the servers can be geographically distributed to provide high availability and high performance by distributing content or services based, in some instances, on proximity to client devices 102A-102Z. The closer a CDN server is to a client device 102A-102N, the faster the content can be delivered to the client device 102A-102N.

In some implementations, content sharing platform 120 can include recommendation engine 151 that can generate content access level recommendations 124 to one or more users (e.g., channel owners) of content sharing platform 120. A content access level recommendation 124 can be an indicator (e.g., interface component such as, for example, a popup message, electronic message, recommendation feed, etc.) that provides a channel owner with personalized data related to enabling (e.g., activating) content access levels on a particular channel. The content access level can be a membership plan for a corresponding tier, a subscription plan for a corresponding tier, etc. In some implementations, a content access level recommendation 124 can be indicative of how many new members are likely to obtain (e.g., by satisfying requirements of) a level of content access within a certain number of days (e.g., from an effective date) from the channel owner enabling (e.g., providing access to, providing for purchase, etc.) content access levels on the channel. For example, a content access level recommendation 124 can indicate to the channel owner that, by offering content access levels, the channel owner can expect 20 members to join their channel (e.g., purchase a membership) within 30 days.

In some implementations, a content access level recommendation 124 can be made using data from a variety of sources including historical and/or current data related to other users, channels, membership plans, playlist media items, recently watched media items, media item ratings, information from a cookie(s), user history, and other sources. In some implementations, a recommendation can be based on an output of trained artificial intelligence (AI) model 160, as will be further described herein. In some implementations, the content access level recommendation 124 can be presented on media player 104A-104N (e.g., on the user interface associated with a channel of a channel owner), sent to a different application associated with the channel owner (e.g., sent as an email to an email address related to the channel creator, sent as a text to a phone number related to the channel creator, etc.) and/or provided to the channel owner using other means.

Training data generator 131 (residing at server machine 130) can generate training data to be used to train recommendation AI model 160. In some implementations, training data generator 131 can generate the training data based on one or more channel related features. A channel related feature can include specific data related to a particular channel. In some implementations, the specific data can be related to a particular time frame corresponding to the activation of one or more levels of content access (allowing users to obtain memberships) on the particular channel (e.g., within 30 days after activation of content access levels, within 15 days after activation of content access levels, within 20 prior to activation of content access levels, 30-60 days after activation of content access levels, 10-100 days prior to activation of content access levels, within 15 days prior to activation of content access levels to 15 days after activation of content access levels, etc. More specifically, a channel related feature can relate to data corresponding to viewer interactions with media items on the channel (e.g., views, likes, comments, viewer group characteristics (e.g., viewer group geographic location, viewer group education level, etc.), channel owner activities on the channel (e.g., number of media items added, number of playlists generated, type of content provided (e.g., livestreams, shorts, videos, etc.), metrics associated with the channel (e.g., number of subscribers, revenue generated by the channel, etc.), and so forth. In a set of illustrative examples, channel related features can include the number of view a particular channel received during a particular time frame, number of subscriptions added during a particular time frame, a number of shares (e.g., sharing with other users one or more media items from the channel) during a particular time frame, total number of media items uploaded to the channel, number of media items uploaded to the channel during a particular time frame, number of a particular type of media item uploaded to the channel during a particular time frame, number of total subscribers to the channel, number of total subscribers during a particular time frame, number of male views during a particular time frame, number of female views during a particular time frame, number of view by a particular demographic during a particular time frame, number of views in a particular geographic region during a particular time frame, type of content added during a particular time frame, number of views using a particular platform or operating system during a particular time frame, type of other content-related features enabled on the channel, number of likes and/or dislikes during a particular time frame, revenue obtained by the channel during a particular time frame, number of post or comments made during a particular time frame, watch hours over a particular during a particular time frame, etc.

Server machine 140 may include a training engine 141. Training engine 141 can train the recommendation AI model 160 using the training data from training data generator 131. In some implementations, the recommendation AI model 160 can refer to the model artifact that is created by the training engine 141 using the training data that includes training inputs and corresponding target outputs (correct answers for respective training inputs). The training engine 141 can find patterns in the training data that map the training input to the target output (the answer to be predicted) and provide the recommendation AI model 160 that captures these patterns. The recommendation AI model 160 can be composed of, e.g., a single level of linear or non-linear operations (e.g., a support vector machine (SVM) or may be a deep network, i.e., an AI model that is composed of multiple levels of non-linear operations). An example of a deep network is a neural network with one or more hidden layers, and such a machine learning model, can be trained by, for example, adjusting weights of a neural network in accordance with a backpropagation learning algorithm or the like. In other or similar implementations, the recommendation AI model 160 can refer to the model artifact that is created by training engine 141 using training data that includes training inputs. Training engine 141 can find patterns in the training data, identify clusters of data that correspond to the identified patterns, and provide the recommendation AI model 160 that captures these patterns. Recommendation AI model 160 can use one or more of support vector machine (SVM), Radial Basis Function (RBF), clustering, supervised machine learning, semi-supervised machine learning, unsupervised machine learning, k-nearest neighbor algorithm (k-NN), linear regression, multi-linear regression, non-linear regression, random forest, gradient-boosted trees, neural network (e.g., artificial neural network), etc.

In some implementations, recommendation AI model 160 can include a generative AI model. A generative AI model can deviate from a machine learning model based on the generative AI model's ability to generate new, original data, rather than making predictions based on existing data patterns. A generative AI model can include a generative adversarial network (GAN), a variational autoencoder (VAE), or a large language model (LLM). In some instances, a generative AI model can employ a different approach to training or learning the underlying probability distribution of training data, compared to some machine learning models. For instance, a GAN can include a generator network and a discriminator network. The generator network attempts to produce synthetic data samples that are indistinguishable from real data, while the discriminator network seeks to correctly classify between real and fake samples. Through this iterative adversarial process, the generator network can gradually improve its ability to generate increasingly realistic and diverse data.

Generative AI models also have the ability to capture and learn complex, high-dimensional structures of data. One aim of generative AI models is to model underlying data distribution, allowing them to generate new data points that possess the same characteristics as training data. Some machine learning models (e.g., that are not generative AI models) focus on optimizing specific prediction of tasks.

Server machine 150 can include recommendation engine 151, which can be configured to apply recommendation AI model 160 to a channel to generate prediction data. In particular, recommendation engine 151 can provide an indication of the channel, as input, to the recommendation AI model 160. In some implementations, the recommendation engine 151 can obtain and/or receive certain channel related features associated with the channel. Recommendation engine 151 can then obtain one or more outputs from recommendation AI model 160, the one or more outputs reflecting one or more content access level recommendations 124. In particular, the recommendation AI model 160 can provide one or more outputs that include data indicative of how many new members may obtain a level of content access within a certain amount of time (e.g., within 30 days) from the owner of the channel enabling content access levels to be obtained by users. In some implementations, recommendation engine 151 can store the predicted output data (e.g., content access level recommendations 124) on data store 110.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
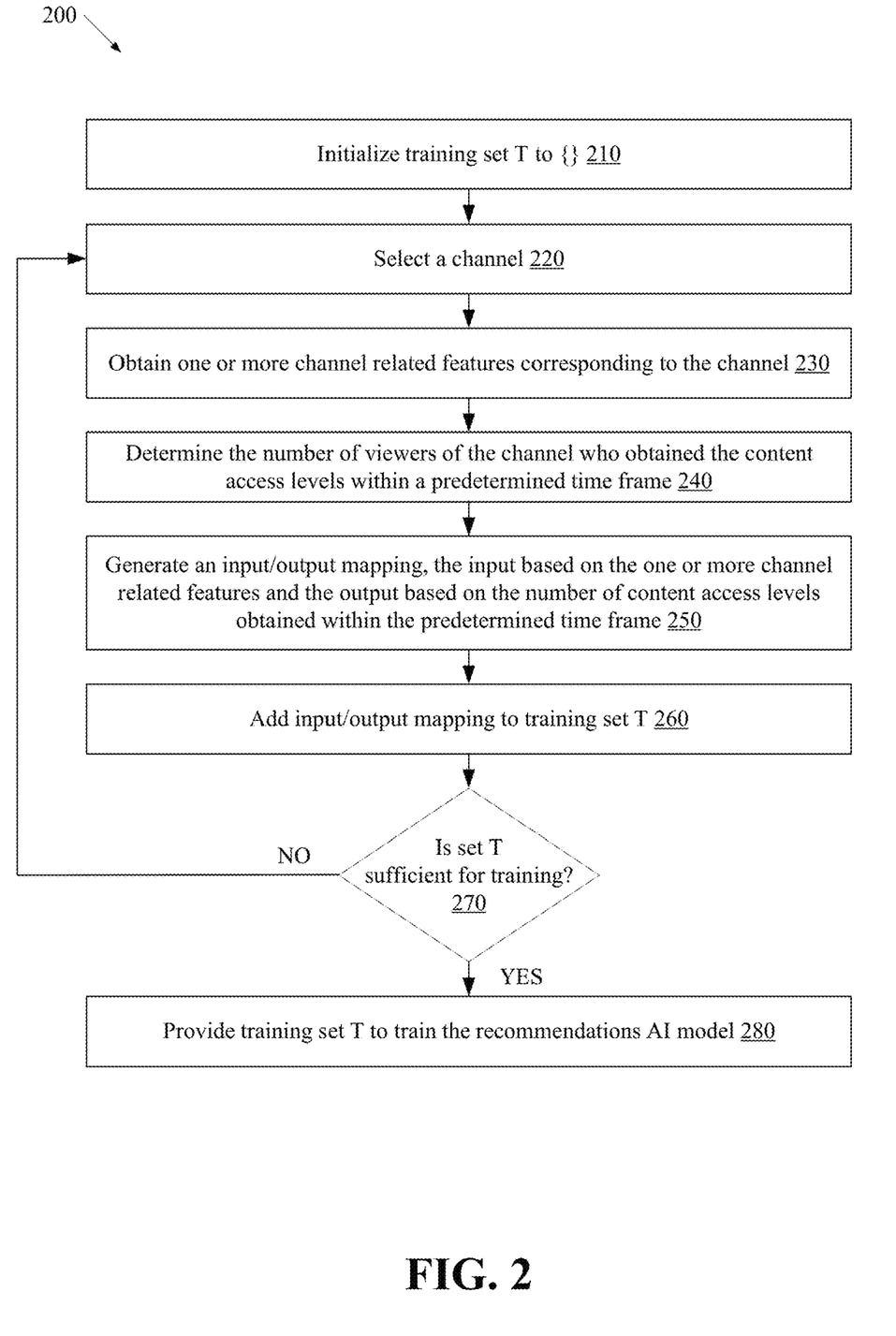
FIG. 2 depicts a flow diagram of an example method for training a recommendation AI model to generate personalized data related to content access levels, in accordance with implementations of the present disclosure, in accordance with implementations of the disclosure.

FIG. 2 depicts a flow diagram of an example method 200 for training a recommendation AI model to generate personalized data related to channel content access levels, in accordance with implementations of the present disclosure. Method 200 can be performed by processing logic that can include hardware (circuitry, dedicated logic, etc.), software (e.g., instructions run on a processing device), or a combination thereof. In one implementation, some or all of the operations of method 200 can be performed by one or more components of system 100 of FIG. 1. In some implementations, some or all of the operations of method 200 can be performed by training data generator 131 and/or training engine 141, as described above.

For simplicity of explanation, method 200, as well as any other method of this disclosure, is depicted and described as a series of acts. However, acts in accordance with this disclosure can occur in various orders and/or concurrently, and with other acts not presented and described herein. Furthermore, not all illustrated acts may be required to implement method 200 in accordance with the disclosed subject matter. In addition, those skilled in the art will understand and appreciate that method 200 could alternatively be represented as a series of interrelated states via a state diagram or events. Additionally, it should be appreciated that method 200 disclosed in this specification are capable of being stored on an article of manufacture (e.g., a computer program accessible from any computer-readable device or storage media) to facilitate transporting and transferring such method to computing devices. The term "article of manufacture," as used herein, is intended to encompass a computer program accessible from any computer-readable device or storage media.

At operation 210, processing logic initiates training set T to { } (e.g., to empty).

At operation 220, processing logic selects a channel. The channel can be a channel that has enabled a particular content-related feature, such as, for example, content access levels (e.g., membership plans, subscription plans, etc.). In some implementations, the channel selected can be a channel that had content access levels enabled for a predetermined amount of time (e.g., enabled for 30 days, 60 days, etc.). In some implementations, the channel can be a channel that enabled content access levels within a predetermined amount of time (e.g., enabled content access levels less than a year prior, less than two years prior, etc.). In some implementations, the channel can be a currently active channel (e.g., a channel currently available on content sharing platform 120), an unavailable channel (e.g., a channel currently unavailable on content sharing platform 120, but data related to the channel, such as, channel related features, is accessible from content sharing platform 120, from data store 110, etc.), etc.

At operation 230, processing logic obtains one or more channel related features corresponding to the channel. In some implementations, the channel related feature(s) can relate to specific data for the particular channel and the specific data can be related to a particular time frame corresponding to the activation of content access levels on the channel. In some implementations, the channel related features can be historical data (e.g., data previously obtained from content sharing platform 120 and stored on, for example, data store 110), can be current data, such as data obtained from a current channel, etc. In an example, the channel related features can include the number of views the content on the channel received 30 days prior to content access levels being activated on the channel, the number of likes the content on the channel received 30 days prior to content access levels being activated on the channel, and the number of subscriptions the content on the channel received within 20 days after content access levels were activated on the channel, etc.

At operation 240, processing logic determines the number of viewers of the channel who obtained the content access levels within a predetermined time frame. For example, processing logic can determine how many users obtained at least one level of content access to the channel within 30 days of the content access level being enabled for procurement.

At operation 250, processing logic generates an input/output mapping, the input based on the channel related feature(s) and the output based on the number of content access levels obtained within the predetermined time frame.

At operation 260, processing logic adds the input/output mapping to training set T.

At operation 270, processing logic determines whether set T is sufficient for training. In response to processing logic determining that set T is not sufficient for training, method 200 can return to operation 220. The processing logic can then select another channel, select different or additional channel related features for a previously selected channel, etc. In response to processing logic determining that set T is sufficient for training, method 200 can proceed to operation 280.

At operation 280, processing logic provides training set T to train an AI model, such as recommendation AI model 160, as described above.

Once processing logic provides the training set T to train the AI model, the AI model can be trained to generate, for a given channel, personalized data related to enabling (e.g., activating) content access levels on a particular channel, such as, a content access level recommendation 124. In some implementations, the channel related features and the corresponding number of viewers can be divided based on individual access levels to train the AI model to provide personalized data related to enabling different content access levels on a particular channel.

Figure 3:
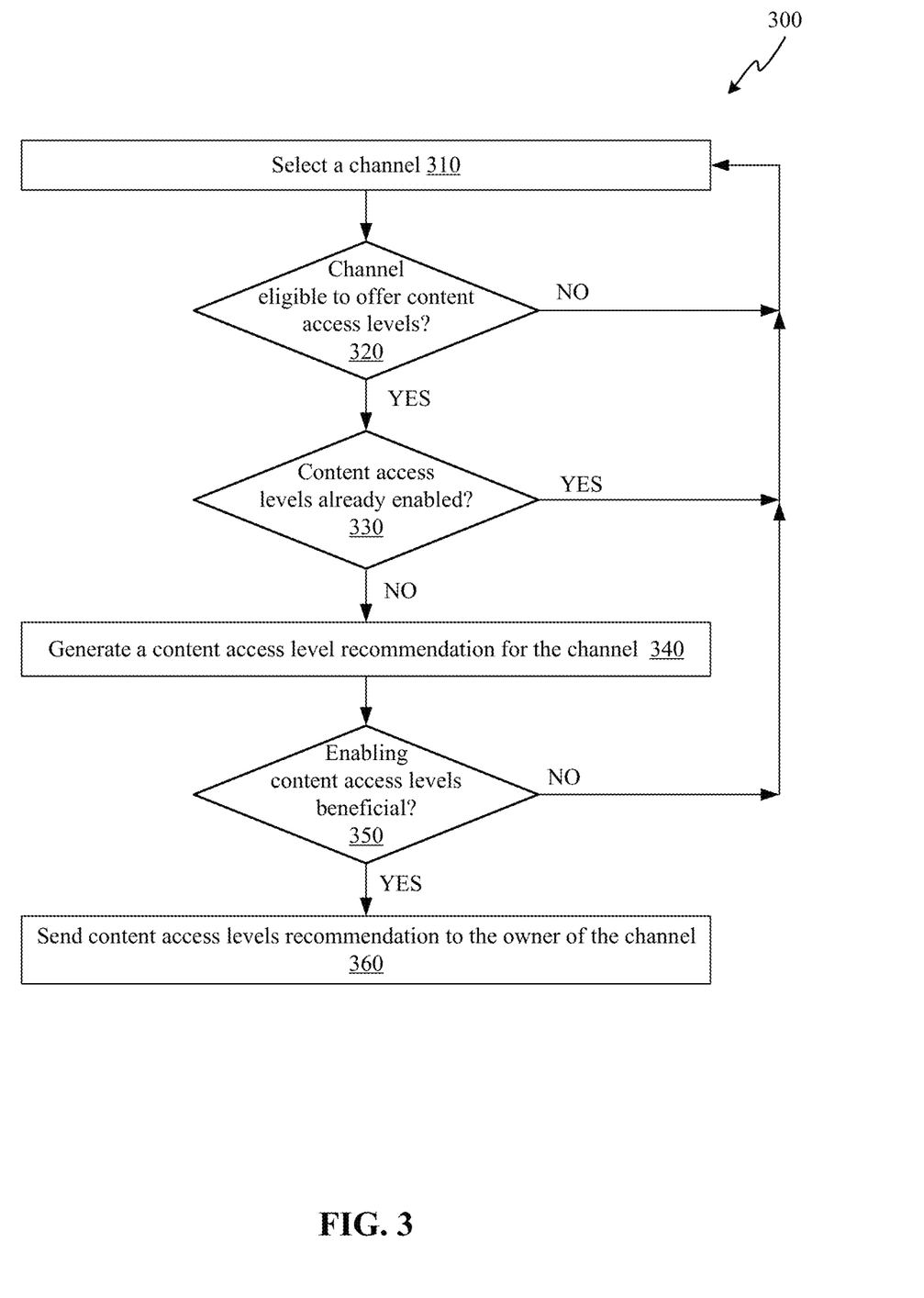
FIG. 3 depicts a flow diagram of an example method for generating content access level recommendations using the recommendation AI model, in accordance with implementations of the disclosure.

FIG. 3 depicts a flow diagram of an example method 300 for generating content access level recommendations using the recommendation AI model, in accordance with implementations of the present disclosure. Method 300 can be performed by processing logic that can include hardware (circuitry, dedicated logic, etc.), software (e.g., instructions run on a processing device), or a combination thereof. In one implementation, some or all of the operations of method 300 can be performed by one or more components of system 100 of FIG. 1. In some embodiments, some or all of the operations of method 300 can be performed by recommendation engine 151, as described above.

At operation 310, processing logic selects a channel. The channel can be selected at random, based on a predetermined criterion (e.g., age of the channel, geographic region of the channel, type of channel, etc.).

At operation 320, processing logic determines whether the channel is eligible to offer content access levels to viewers. For example, the content access level can be a membership plan for a corresponding tier, a subscription plan for a corresponding tier, etc. To determine whether the channel is eligible to offer content access levels, the processing logic can determine whether the channel and/or channel owner can provide access to certain content-related features (e.g., to monetization features) and/or whether the channel and/or the channel owner satisfy eligibility criteria. In some implementations, the eligibility criteria can relate to the number of subscribers to the channel, the number of public watch hours over a particular time period (e.g., 100 public watch hours over the previous month), the type of content offered, etc. Responsive to the processing logic determining that the channel is not eligible to offer content access levels to viewers, the processing logic proceeds to operation 310 and selects another channel. Responsive to the processing logic determining that the channel is eligible to offer content access levels to viewers, the processing logic proceeds to operation 330.

At operation 330, processing logic determines whether the channel has already enabled content access levels. In particular, the processing logic determines whether the channel currently offers at least one level of content access for viewers to obtain (e.g., by paying for a membership option associated the above level of content access). Responsive to the processing logic determining that the channel already offers at least one content access level to viewers, the processing logic proceeds to operation 310 and selects another channel. Responsive to the processing logic determining that the channel does not offer content access levels to viewers, the processing logic proceeds to operation 340.

At operation 340, processing logic generates a content access level recommendation for the channel. In particular, the processing logic obtains one or more channel related features related to the channel. The processing logic then provides an indication of the one or more channel related features as input to recommendation AI model 160. The recommendation AI model 160 can be trained via, for example, method 200 of FIG. 2. The processing logic then, via the trained AI model, generates a content access level recommendation (e.g., content access level recommendation 124) for the channel. The content access level recommendation can indicate how many new members are likely to obtain at least one level of content access within a certain (predetermined) amount of time of offering content access levels to viewers. For example, the content access level recommendation can indicate that the channel can be expected to obtain 40 members within 30 days of enabling two content access levels. In another example, the content access level recommendation can indicate that the channel can be expected to obtain 60 members within 30 days of enabling three content access levels.

At operation 350, processing logic determines whether enabling content access levels for the channel is beneficial. In some implementations, the processing logic can determine whether the number of expected members satisfies a benefit threshold criterion. For example, responsive to the threshold criterion being 20 new members within 30 days of enabling content access levels, the processing logic can determine that enabling content access levels is beneficial for the channel. The benefit threshold criterion can be a predetermined value, a dynamic value, etc. used to determine whether to send the recommendation to the channel owner. The benefit threshold criterion can be based on monetary metrics, analytic data, operator (e.g., user) input, etc. Responsive to the processing logic determining that enabling content access levels is not beneficial to channel owner (e.g., the number of expected members fails to satisfy the benefit threshold criterion), the processing logic can discard the recommendation and proceed to operation 310 to select another channel. Responsive to the processing logic determining that enabling content access levels is beneficial to the channel owner (e.g., the number of expected members satisfies the benefit threshold criterion), the processing logic proceeds to operation 360.

At operation 360, the processing logic sends the content access level recommendation to the channel owner. In some implementations, the content access level recommendation can be provided for presentation on the user interface associated with the channel, sent to an email address related to the channel owner, sent as a text to a phone number related to the channel owner, etc. The recommendation can reflect the predicted number of new users to obtain the at least one content access level within the predetermined time of the effective date of the at least one content access level for the channel.

Figure 4:
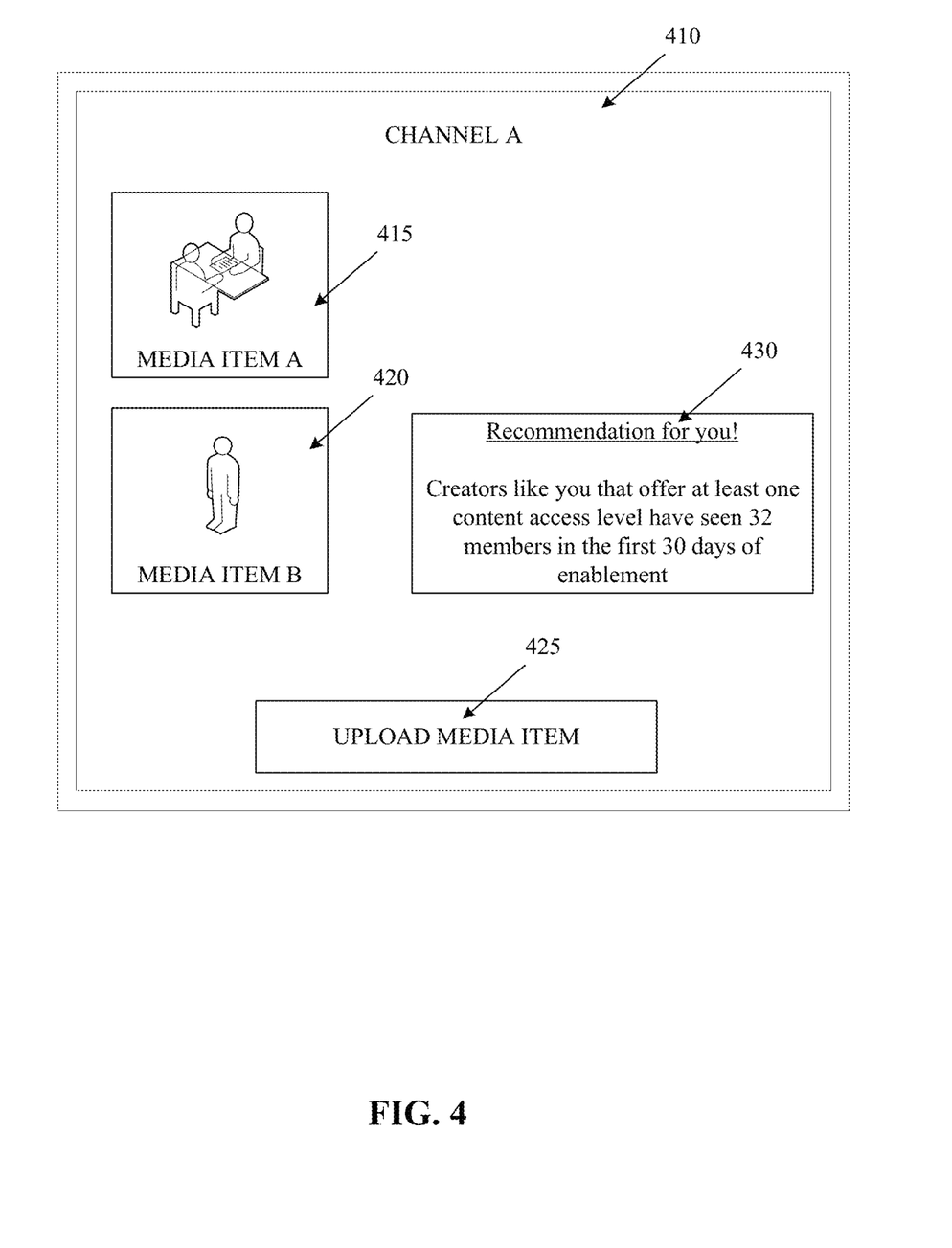
FIG. 4 is an illustration of an example graphical user interface (GUI) showing a content access level recommendation on a channel owner's channel, in accordance with implementations of the disclosure.

FIG. 4 an example graphical user interface (GUI) showing a content access level recommendation on a channel owner's channel. GUI 410 allows a channel owner to edit channel A. In particular, channel A includes two media items (media item A 415 and media item B 420) uploaded to channel A by the channel owner. Button 425 allows the channel owner to upload additional media items. Content access level recommendation 430 is a pop-up window displayed on GUI 410. Content access level recommendation 430 includes a message to the channel owner that reads "Creators like you that offer at least one content access level have seen 32 members in the first 30 days of enablement." Content access level recommendation 430 can be generated by recommendation engine 151 using method 300.

Figure 5:
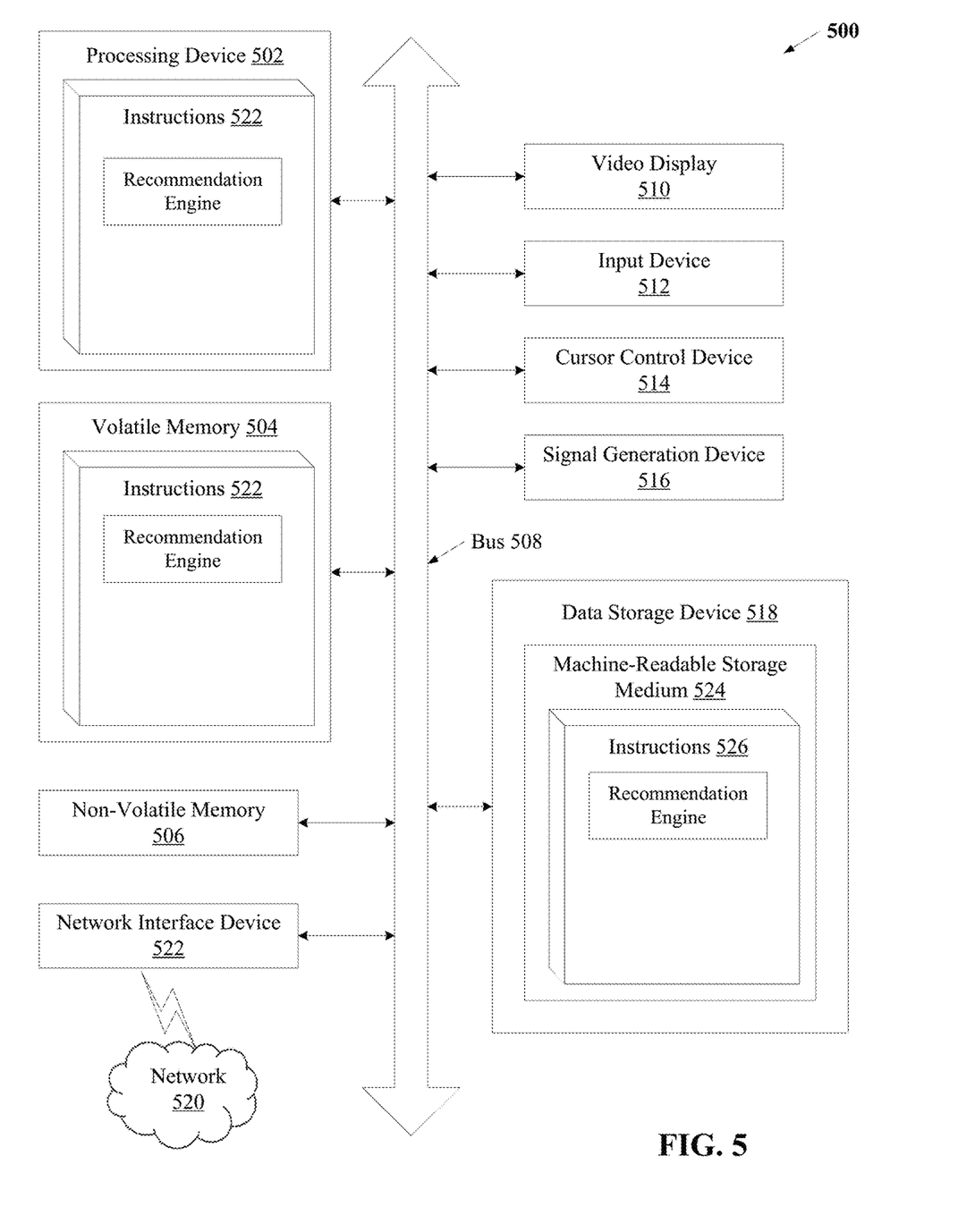
FIG. 5 depicts a block diagram of an example computing device operating in accordance with one or more aspects of the present disclosure.

FIG. 5 depicts a block diagram of a computer system operating in accordance with one or more aspects of the present disclosure. In certain implementations, computer system 500 can be connected (e.g., via a network, such as a Local Area Network (LAN), an intranet, an extranet, or the Internet) to other computer systems. Computer system 500 can operate in the capacity of a client device. Computer system 500 can operate in the capacity of a server or a client computer in a client-server environment. Computer system 500 can be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 can include a processing device 502, a volatile memory 504 (e.g., random access memory (RAM)), a non-volatile memory 506 (e.g., read-only memory (ROM) or electrically erasable programmable ROM (EEPROM)), and a data storage device 518, which can communicate with each other via a bus 508.

Processing device 502 can be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 can further include a network interface device 522. Computer system 500 also can include a video display unit 510 (e.g., an LCD), an input device 512 (e.g., a keyboard, an alphanumeric keyboard, a motion sensing input device, touch screen), a cursor control device 514 (e.g., a mouse), and a signal generation device 516.

Data storage device 518 can include a non-transitory machine-readable storage medium 524 on which can store instructions 526 encoding any one or more of the methods or functions described herein, including instructions encoding components of client device of FIG. 1 for implementing methods 300 and 400.

Instructions 526 can also reside, completely or partially, within volatile memory 504 and/or within processing device 502 during execution thereof by computer system 500, hence, volatile memory 504 and processing device 502 can also constitute machine-readable storage media.

While machine-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein can be implemented by discrete hardware components or can be integrated in the functionality of other hardware components such as ASICS, FPGAs, DSPs or similar devices. In addition, the methods, components, and features can be implemented by firmware modules or functional circuitry within hardware devices. Further, the methods, components, and features can be implemented in any combination of hardware devices and computer program components, or in computer programs.

Unless specifically stated otherwise, terms such as "receiving," "determining," "sending," "displaying," "identifying," "selecting," "excluding," "creating," "adding," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and cannot have an ordinal meaning according to their numerical designation.

Examples described herein also relate to an apparatus for performing the methods described herein. This apparatus can be specially constructed for performing the methods described herein, or it can comprise a general-purpose computer system selectively programmed by a computer program stored in the computer system. Such a computer program can be stored in a computer-readable tangible storage medium.

The methods and illustrative examples described herein are not inherently related to any particular computer or other apparatus. Various general-purpose systems can be used in accordance with the teachings described herein, or it can prove convenient to construct more specialized apparatus to perform methods 300 and 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
identifying, by a processor, a channel associated with a user of a content sharing platform;
providing an indication of one or more channel related features associated with the channel as input to an artificial intelligence (AI) model, wherein the AI model is trained to predict a number of new users to obtain at least one content access level for the channel within a predetermined time of an effective date of the at least one content access level for the channel; and
obtaining one or more outputs of the AI model, wherein the one or more obtained outputs comprise a predicted number of new users to obtain at least one content access level for the channel within a predetermined time of an effective date of the at least one content access level for the channel; and
providing, for presentation on a client device of the user, a recommendation reflecting the predicted number of new users to obtain the at least one content access level within the predetermined time of the effective date of the at least one content access level for the channel.

2. The method of claim 1, wherein each of the one or more channel related features are associated with at least one of data corresponding to viewer interactions with media items on the channel, activities performed by the user on the channel, or metrics associated with the channel.

3. The method of claim 1, wherein one or more channel related features used to train the AI model are each associated with a time frame related to activation of a respective content access level on a corresponding channel.

4. The method of claim 1, wherein the indicator is at least one of a pop-up message on a user interface associated with the channel, an email, or a text message.

5. The method of claim 1, further comprising:
determining whether the predicted number of new users satisfies a threshold criterion; and
responsive to determining that the predicted number of new users fails to satisfy the threshold criterion, refraining from providing the recommendation.

6. The method of claim 1, further comprising:
determining whether the predicted number of new users satisfies a threshold criterion; and
responsive to determining that the predicted number of new users satisfies the threshold criterion, sending the recommendation to the client device of the user.

7. The method of claim 1, further comprising:
responsive to determining that the channel is eligible to offer content access levels to users, determining whether the channel currently offers at least one content access level to users; and
responsive to determining that the channel does not currently offer at least one content access level to users, providing the indication of the one or more channel related features associated with the channel as input to the AI model.

8. A system comprising:
a memory; and
a processing device, coupled to the memory, the processing device to perform operations comprising:
identifying a channel associated with a user of a content sharing platform;
providing an indication of one or more channel related features associated with the channel as input to an artificial intelligence (AI) model, wherein the AI model is trained to predict a number of new users to obtain at least one content access level for the channel within a predetermined time of an effective date of the at least one content access level for the channel; and
obtaining one or more outputs of the AI model, wherein the one or more obtained outputs comprise a predicted number of new users to obtain at least one content access level for the channel within a predetermined time of an effective date of the at least one content access level for the channel; and
providing, for presentation on a client device of the user, a recommendation reflecting the predicted number of new users to obtain the at least one content access level within the predetermined time of the effective date of the at least one content access level for the channel.

9. The system of claim 8, wherein each of the one or more channel related features are associated with at least one of data corresponding to viewer interactions with media items on the channel, activities performed by the user on the channel, or metrics associated with the channel.

10. The system of claim 8, wherein one or more channel related features used to train the AI model are each associated with a time frame related to activation of a respective content access level on a corresponding channel.

11. The system of claim 8, wherein the indicator is at least one of a pop-up message on a user interface associated with the channel, an email, or a text message.

12. The system of claim 8, wherein the operations further comprise:
determining whether the predicted number of new users satisfies a threshold criterion; and
responsive to determining that the predicted number of new users fails to satisfy the threshold criterion, refraining from providing the recommendation.

13. The system of claim 8, wherein the operations further comprise:
determining whether the predicted number of new users satisfies a threshold criterion; and
responsive to determining that the predicted number of new users satisfies the threshold criterion, sending the recommendation to the client device of the user.

14. The system of claim 8, wherein the operations further comprise:
responsive to determining that the channel is eligible to offer content access levels to users, determining whether the channel currently offers at least one content access level to users; and
responsive to determining that the channel does not currently offer at least one content access level to users, providing the indication of the one or more channel related features associated with the channel as input to the AI model.

15. A non-transitory computer-readable medium comprising instructions that, responsive to execution by a processing device, cause the processing device to perform operations comprising:
identifying a channel associated with a user of a content sharing platform;
providing an indication of one or more channel related features associated with the channel as input to an artificial intelligence (AI) model, wherein the AI model is trained to predict a number of new users to obtain at least one content access level for the channel within a predetermined time of an effective date of the at least one content access level for the channel; and
obtaining one or more outputs of the AI model, wherein the one or more obtained outputs comprise a predicted number of new users to obtain at least one content access level for the channel within a predetermined time of an effective date of the at least one content access level for the channel; and
providing, for presentation on a client device of the user, a recommendation reflecting the predicted number of new users to obtain the at least one content access level within the predetermined time of the effective date of the at least one content access level for the channel.

16. The non-transitory computer-readable storage medium of claim 15, wherein each of the one or more channel related features are associated with at least one of data corresponding to viewer interactions with media items on the channel, activities performed by the user on the channel, or metrics associated with the channel.

17. The non-transitory computer-readable storage medium of claim 15, wherein one or more channel related features used to train the AI model are each associated with a time frame related to activation of a respective content access level on a corresponding channel.

18. The non-transitory computer-readable storage medium of claim 15, wherein the indicator is at least one of a pop-up message on a user interface associated with the channel, an email, or a text message.

19. The non-transitory computer-readable storage medium of claim 15, wherein the operations further comprise:
determining whether the predicted number of new users satisfies a threshold criterion;

responsive to determining that the predicted number of new users fails to satisfy the threshold criterion, refraining from providing the recommendation; and responsive to determining that the predicted number of new users satisfies the threshold criterion, sending the recommendation to the client device of the user.

20. The non-transitory computer-readable storage medium of claim 15, wherein the operations further comprise:

responsive to determining that the channel is eligible to offer content access level to users, determining whether the channel currently offers at least one content access level to users; and responsive to determining that the channel does not currently offer at least one content access level to users, providing the indication of the one or more channel related features associated with the channel as input to the AI model.

\* \* \* \* \*